July 25, 1944. K. T. GREENWOOD 2,354,515
TRIPOD HEAD FOR CAMERAS AND THE LIKE
Filed Nov. 1, 1943 6 Sheets-Sheet 1

Inventor:
Kendall T. Greenwood,
by Heard Smith & Tennant
Attorneys

July 25, 1944.  K. T. GREENWOOD  2,354,515
TRIPOD HEAD FOR CAMERAS AND THE LIKE
Filed Nov. 1, 1943  6 Sheets-Sheet 3

Inventor:
Kendall T. Greenwood,
by Heard Smith & Tennant
Attorneys

July 25, 1944.　　K. T. GREENWOOD　　2,354,515
TRIPOD HEAD FOR CAMERAS AND THE LIKE
Filed Nov. 1, 1943　　6 Sheets-Sheet 4

Inventor:
Kendall T. Greenwood
by Heard Smith Tennant
Attorneys

July 25, 1944.　　　　K. T. GREENWOOD　　　　2,354,515
TRIPOD HEAD FOR CAMERAS AND THE LIKE
Filed Nov. 1, 1943　　　　6 Sheets-Sheet 5
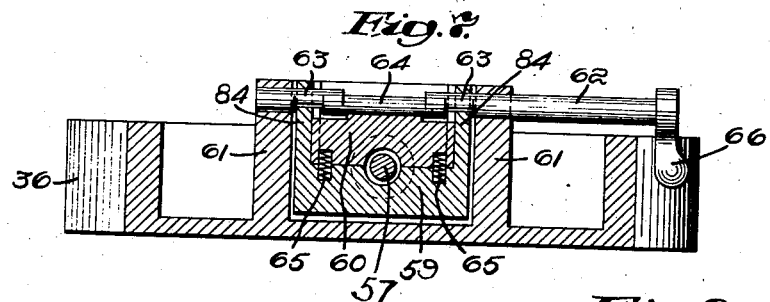
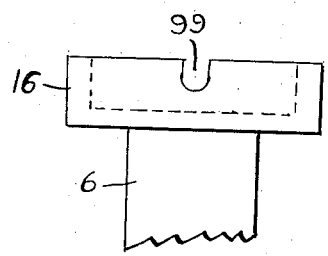 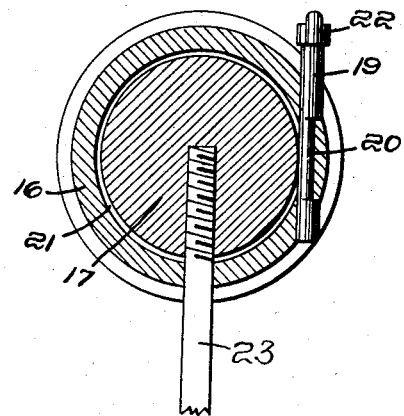
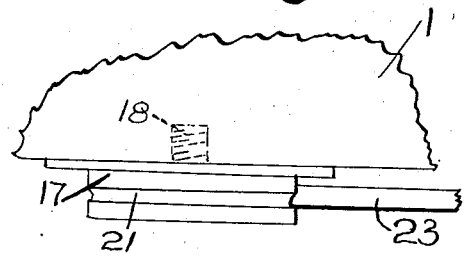
Inventor:
Kendall T. Greenwood
by Heard Smith Tennant
Attorneys July 25, 1944.  K. T. GREENWOOD  2,354,515
TRIPOD HEAD FOR CAMERAS AND THE LIKE
Filed Nov. 1, 1943  6 Sheets-Sheet 6
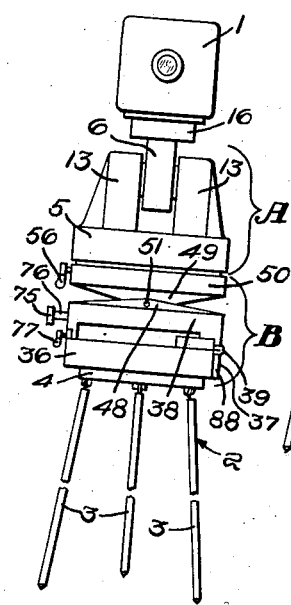
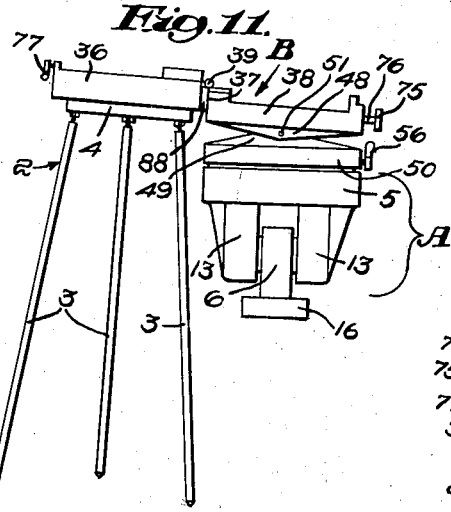
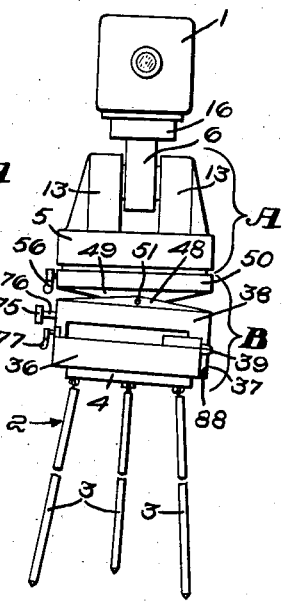
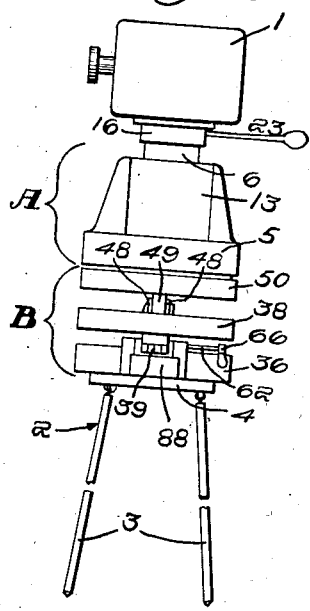
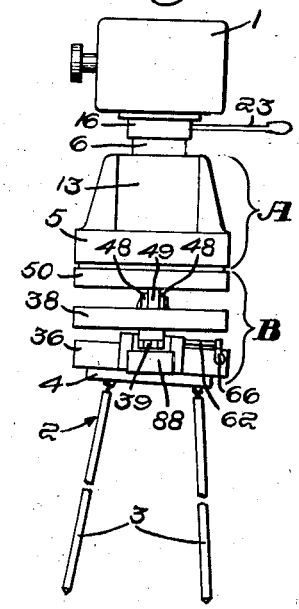
Inventor:
Kendall T. Greenwood,
by Heard Smith & Tennant
Attorneys Patented July 25, 1944

2,354,515

UNITED STATES PATENT OFFICE 2,354,515

TRIPOD HEAD FOR CAMERAS AND THE LIKE

Kendall T. Greenwood, Sanford, Maine

Application November 1, 1943, Serial No. 508,499

9 Claims. (Cl. 248—183)

This invention relates to tripod supports for cameras, surveyors' instruments, and so forth.

Tripods for such use are usually provided with a head portion or head assembly on which the camera or other instrument is mounted and which is provided with a leveling table that can be leveled up after the tripod has been placed in any given position so as to bring the camera or other instrument into a true level position even though the tripod itself may not be perfectly level.

One of the objects of the invention is to provide a tripod head assembly having novel means for leveling up the camera or other instrument.

A further object of the invention is to provide a novel tripod head assembly which is so constructed that the leveling of the camera may be accomplished by the action of gravity.

Still a further object of the invention is to provide a novel tripod head assembly which is so constructed that the portion thereof carrying the leveling table can be swung into an inverted suspended position in which the center of gravity of such portion is below its support and in which the leveling table is free to assume by gravity an inverted position with its vertical axis in a true vertical line, and which is also so constructed that when the portion of the head assembly carrying the leveling table is swung back again into its upright position the true vertical alinement of the vertical axis of the leveling table will be maintained so that when the camera or other instrument is mounted on the head, such instrument will be correctly leveled up.

A further object of the invention is to provide novel means for steadying the panning movement of the camera whether such movement is in a horizontal plane about a vertical axis or is in a vertical plane about a horizontal axis.

Other objects of the invention are to improve generally tripod heads in the particulars hereinafter set forth.

In order to give an understanding of the invention, I have shown it herein as it might be applied to a moving picture camera, but many features of the invention, such as the means for leveling up the leveling table, are equally applicable to surveyors' instruments or to any other instruments that are designed to be supported on a tripod and which require to be properly leveled up before they are used.

For the sake of simplification I will hereinafter refer to the invention as it woud be used in leveling up a camera with the understanding that the invention is not limited in its use to cameras.

In the drawings wherein I have illustrated a selected embodiment of my invention, Fig. 1 is a vertical sectional view through means for mounting the camera on a tripod embodying my invention, said section being taken on substantially the line 1—1, Fig. 2.

Fig. 2 is a side view of Fig. 1 looking toward the right.

Fig. 3 is a section on the line 3—3, Fig. 1.
Fig. 4 is a section on the line 4—4, Fig. 1.
Fig. 5 is a section on the line 5—5, Fig. 1.
Fig. 6 is a section on the line 6—6, Fig. 1.
Fig. 7 is a section on the line 7—7, Fig. 1.

Fig. 8 is a fragmentary plan view of the clamping means by which the level position of the leveling table is maintained.

Fig. 9 is a section on the line 9—9, Fig. 1.

Figs 10–15 are views illustrating the manner in which the leveling table is leveled up by the action of gravity.

Figs. 16 and 17 are fragmentary views illustrating the manner in which the camera or other instrument is attached to the head assembly.

Figure 1:
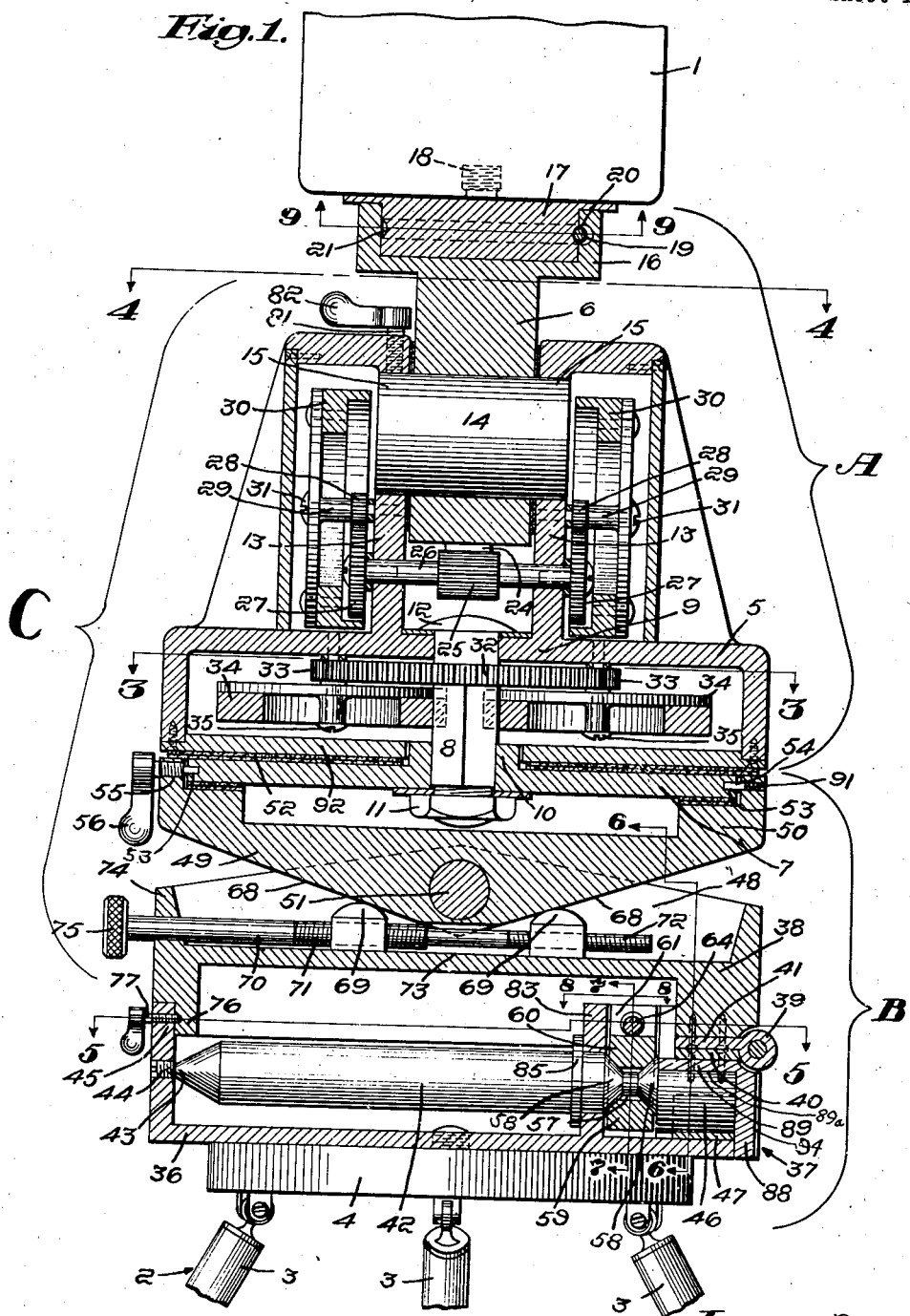
Figure 2:
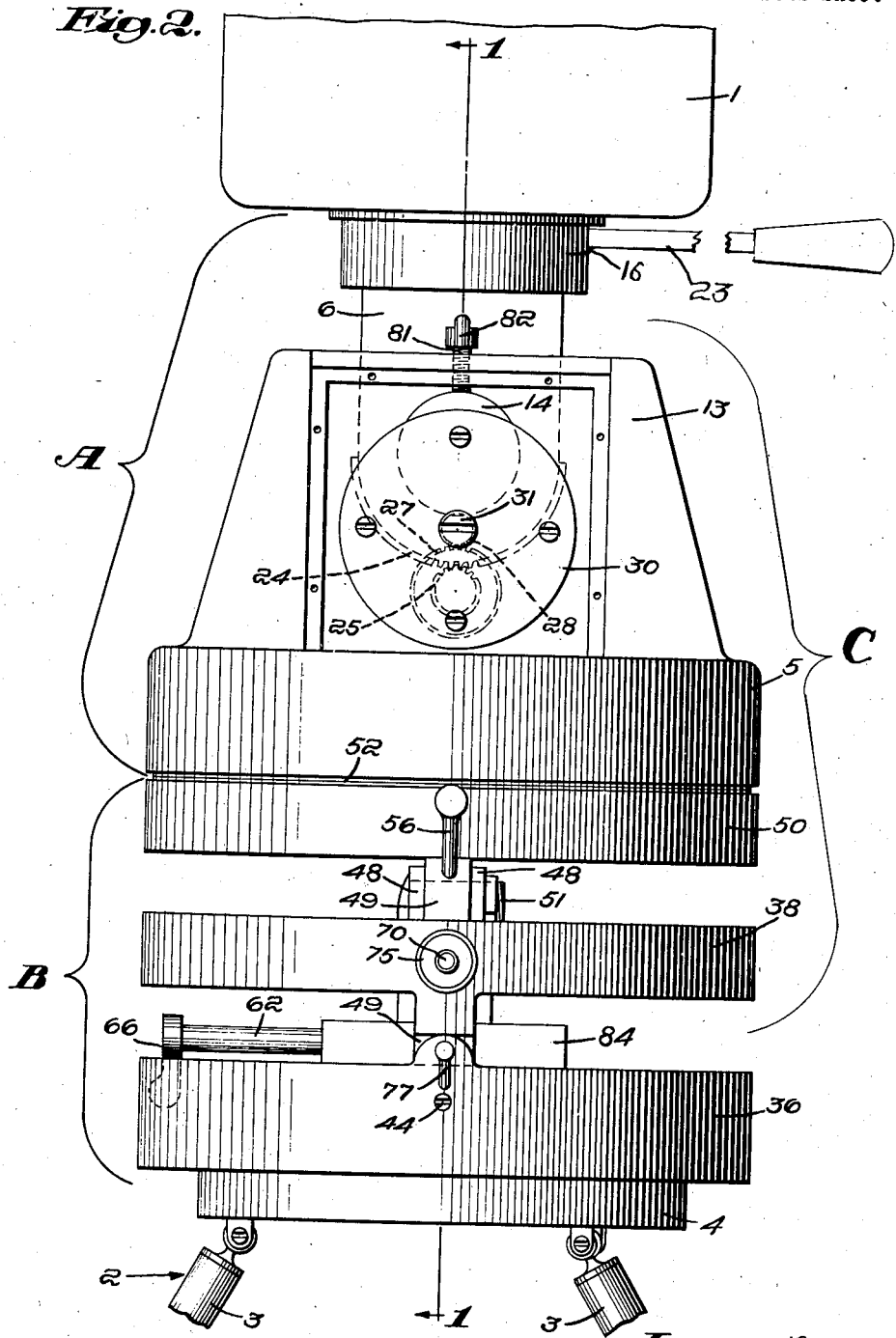
Figure 3:
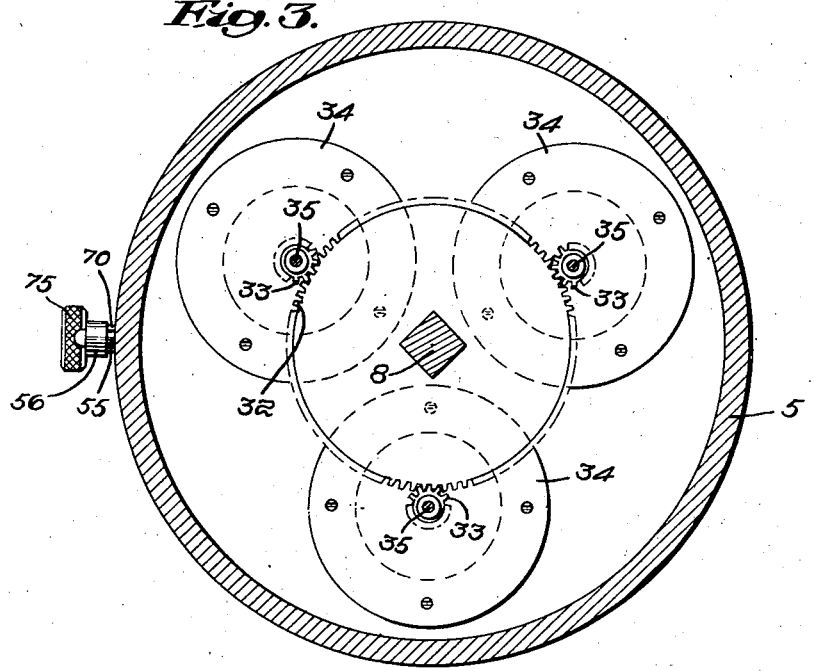
Figure 4:
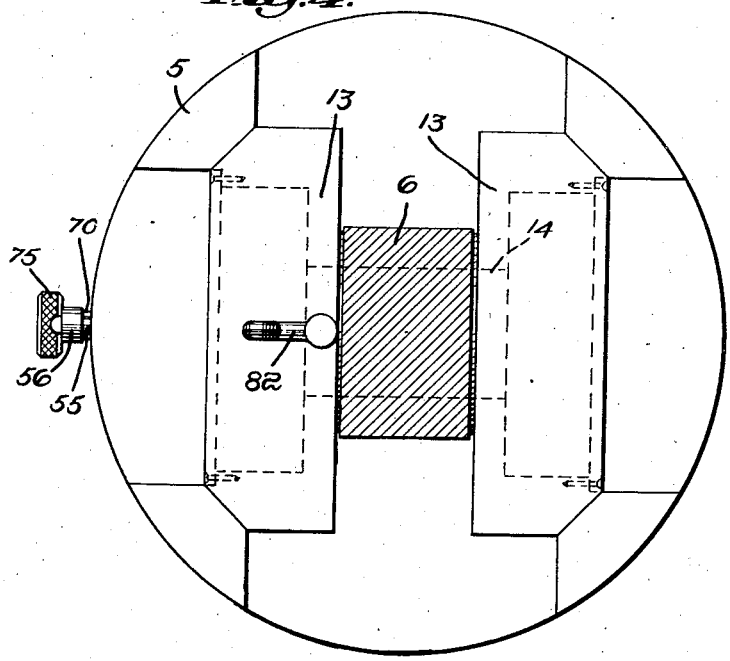
Figure 5:
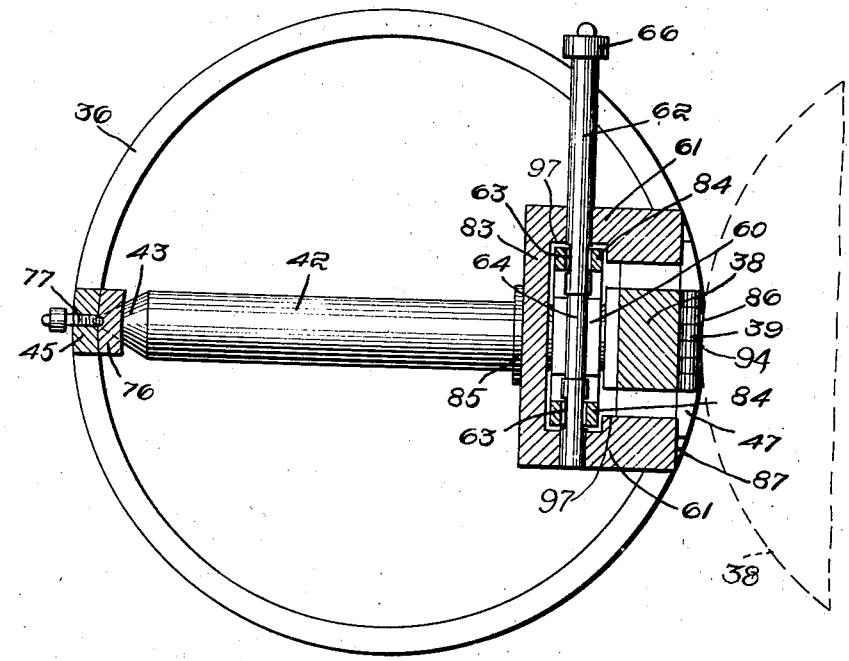

In the drawings 1 indicates the camera or other instrument and 2 indicates the tripod which has the usual legs 3 that are pivotally connected to a plate 4 on which is mounted the instrument-supporting head assembly that embodies my invention.

This head assembly comprises a panning assembly A and a leveling assembly B by which the camera or other instrument is leveled. The leveling assembly B is mounted directly on the plate 4 of any tripod and the panning assembly A is mounted on the leveling assembly B.

The panning assembly A comprises a camera-supporting member 5 adapted to turn about a vertical axis and an arm 6 to which the camera 1 is detachably secured and which is mounted on the member 5 to turn about a horizontal axis. The member 5 is mounted on the leveling table 7 which forms part of the leveling assembly that will be presently described. This leveling table 7 has a vertical stud 8 rigid therewith that forms a vertical pivotal element about which the member 5 can turn. This camera-supporting member 5 is shown as having a horizontal web portion 9 having a central aperture through which the stud 8 extends. This stud 8 has a squared lower section which extends through a squared opening in the hub 10 of the leveling table, and said stud is screw threaded at its lower end to receive the clamping nut 11. This stud is headed as shown at 12 and thus serves to couple the member 5 to the leveling table while permitting the member 5 to turn about the stud.

This member 5 is provided with two upstanding side members 13 between which the arm 6 is received, and said arm has rigid therewith a horizontal trunnion member 14, the ends 15 of which project beyond the arm and are mounted for turning movement in the side members 13. This arm 6 is provided at its upper end with a head 16 having a cylindrical recess to receive a boss 17 that is secured to the underside of the camera 1, said boss being shown as having the screw-threaded stud 18 which screw threads into the bottom of the camera.

The boss 17 is removably mounted in the head 16 to enable the camera to be readily removed from its mounting, and for locking the boss to the head, there is provided a locking member 19 in the form of a shaft that is journaled in the head 16 and is provided with an eccentric portion 20 adapted to engage in an annular recess 21 with which the boss 17 is provided. This shaft 19 has a thumb piece or handle 22 on its end by which it can be turned. When the shaft is in the position shown in Figs. 1 and 9, the eccentric portion 20 occupies the groove 21 of the boss thereby locking the boss to the head. By turning the shaft through 180 degrees, the eccentric portion 20 is carried out of the groove 21 thus permitting the camera with its boss 17 to be removed from the head.

The boss 17 is provided with the usual panning handle 23 by which the camera may be swung either about its horizontal axis exemplified by the trunnion member 14 or about its vertical axis exemplified by the stud 8, said handle extending through a slot 99 formed in the side wall of the head 16.

One feature of the invention relates to novel means for steadying the panning movement of the camera so as to provide a steady even panning movement.

The lower end of the arm 6 is rounded and carries a set of gear teeth 24 that mesh with gear teeth 25 on the shaft 26 journaled in the two side pieces 13. This shaft 26 has fast thereon at each end a gear 27 of larger diameter than the gear 25 and each gear 27 meshes with a small pinion 28 rigidly secured to the hub 29 of an inertia wheel 30 which is mounted on a stud 31 carried by the side piece 13.

The gearing between the gear teeth 24 on the arm 6 and each inertia wheel is a speed-increasing gearing. When the camera is turned about its horizontal axis, the inertia wheels 30 will be rotated, and the inertia of these wheels provides a steady motion to the camera.

A somewhat similar steadying device is employed in connection with the turning of the camera about its vertical axis.

The stationary stud 8 has fast thereon a gear 32 which meshes with small pinions 33 rigid with the inertia wheels 34. These inertia wheels 34 are mounted on studs 35 secured to and depending from the web 9 of the member 5. Three such inertia wheels are herein shown although the number may be varied. When the member 5 and the camera is turned about its vertical axis, that is, about the stud 8, the pinions 33 will be moved about the periphery of the stationary gear 32, and this will serve to give rapid rotation to the inertia wheels 34. The inertia wheels 34 serve to steady the panning movement of the camera about its vertical axis and the inertia wheels 30 similarly serve to steady the panning motion of the camera about its horizontal axis.

The leveling assembly B is, as stated above, constructed so that the leveling up of the leveling table 7 is accomplished by the action of gravity. The leveling operation is preferably performed, however, while the camera or other instrument is removed from the head assembly. In other words, the camera or other instrument will be removed from the head assembly before the leveling operation takes place.

The leveling assembly B is so constructed as to permit the portion of the head assembly that carries the leveling table and the instrument supporting member 5 to be swung into an inverted position at one side of the tripod plate 4, and such leveling assembly is also so constructed that when it is thus swung into its inverted position the leveling plate is free to assume by gravity a horizontal position with the axis of the stud 8 in a true vertical position regardless of any angular position which the tripod plate 4 may occupy.

This portion of the head assembly which is thus capable of being swung into an inverted position may be referred to as an invertible assembly and it is indicated in the drawings at C.

After the invertible assembly has thus been swung into its inverted position and the leveling plate has assumed by gravity its true horizontal but inverted position with the stud 8 in a true vertical position, then the leveling table is locked in such position relative to the leveling assembly B and the invertible assembly C may then be turned back into its upright position in which upright position the leveling table 7 will assume a correct horizontal position and the stud 8 a correct vertical position even though the plate 4 of the tripod has a more or less angular position.

This leveling assembly comprises a base member 36 which is rigidly secured to the tripod plate 4 and it also comprises a two-part rocking member that is mounted on the base 36 for turning movement about a horizontal axis and on which rocking member the leveling member 7 is mounted to turn about another horizontal axis at right angles to the first-mentioned horizontal axis.

Figure 6:
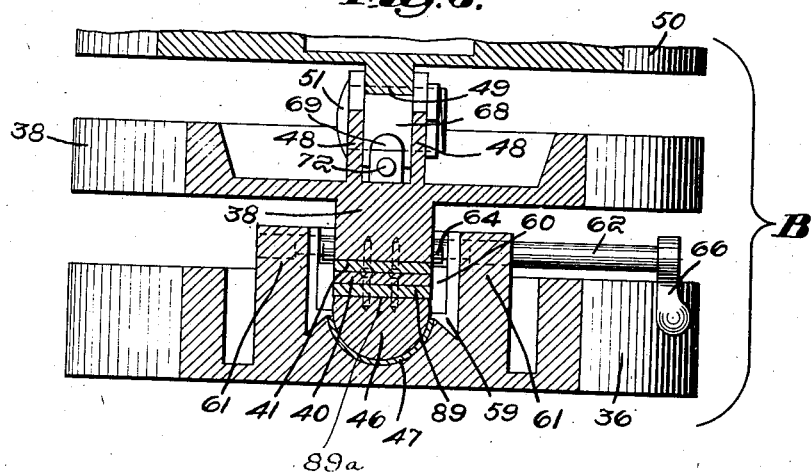

This two-part rocking member comprises the lower section 37 and the upper section 38, said two sections being hinged together by the hinge 39, one leaf 40 of which is secured to the portion 89 of the lower section 37 and the other leaf 41 of which is secured to the underside of the section 38. The lower section 37 is formed with a shaft or cylindrical portion 42 having a pointed end 43 that has bearing in a bearing stud 44 carried by the end wall 45 of the base member 36. The other or right hand end 46 of the shaft 42 has a larger diameter than the body of said shaft (see Figs. 1 and 6), and this portion 46 of larger diameter is slabbed off on its upper side parallel to the axis of said shaft to form a flat side face 89a to which the portion 89 of the section 37 is secured. Said right hand end 46 of the shaft 42 is mounted for turning movement in a bearing 47 carried by the base 36. This two-part rocking member, therefore, is capable of having a turning movement relative to the base 36 about the axis of the shaft 42.

The upper section 38 of the rocking member is shown as having a pair of ribs 48 rising therefrom between which is received a rib 49 formed on the underside of a leveling support 50 that carries the leveling table 7.

This leveling support 50 is pivotally connected to the upper section 38 of the rocking member through a pivotal connection 51 which pivotally connects the rib 49 on said support 50 to the two ribs 48 on the member 38. The axis of such pivotal connection 51 extends horizontally but at right angles to that of the shaft 42. This leveling support 50 is formed in its upper side with a recess which receives the leveling table 7 on which the member 5 rests. 52 indicates the usual graphite washers such as are usually used in camera mountings between the leveling table and the rotatable camera fitting supported thereon.

The leveling table 7 is mounted on the leveling support 50 so as to permit said leveling table to be freely turned about a vertical axis relative to the support 50 and to be locked to said support in any adjusted position.

For this purpose the leveling table 7 is shown as having a peripheral groove 53 in which is received a plurality of inwardly-projecting pins 54 carried by the rim of the leveling support 50 and backed by springs 91, said springs serving to hold the inner end of the pins in the groove. 55 indicates a clamping screw carried by the leveling support 50, the inner end of which screw is reduced in diameter and is adapted to engage in said groove 53. This clamping screw is provided with a handle or thumb piece 56 by which it can be manipulated.

When the clamping screw 55 is loosened, then the leveling table can be turned about its vertical axis relative to the leveling support thereby to direct the camera in any desired direction. By tightening the clamping screw 55 the leveling table will be clamped to the leveling support and will become rigid therewith.

When the tripod has been set up and the head assembly is to be leveled, the camera or other instrument will first be removed from the head assembly, which may be done by turning the clamping rod 19 to unclamp the boss 17 from the head 16, after which the camera or other instrument with its boss 17 and the panning handle attached thereto may be taken off from the part 16. The panning assembly A, the leveling support 50 and the upper part 38 of the rocking member, which comprise the invertible assembly C are then turned about the hinge 39 into an inverted position as shown in Figs. 11 and 14. When in this inverted position the leveling table is retained in its position relative to the leveling support by the pins 54 and the clamping screw 55, and the rocking member is free to turn relative to the base 36 about the axis of the shaft 42 while the leveling member 50 is also free to turn about the pivotal connection 51. In such inverted position the center of gravity of the panning assembly A is below the axis of the shaft 42 and also below the pivotal connection 51 and hence the action of gravity will cause the panning assembly to assume a true vertical position with the axis of the stud 8 extending vertically and consequently with the leveling table 7 occupying a horizontal position. This is best illustrated in Figs. 10, 11, 13, and 14. In these figures the tripod is shown as being so set up that the plate 4 occupies a slightly angular position relative to the vertical, and in Figs. 10 and 13 the camera or other instrument 1 is shown as mounted on the head assembly while Figs. 11 and 14 show the invertible assembly C in its inverted position but with the camera or other instrument removed from the head assembly.

As stated above, when the invertible assembly is thus swung into its inverted position as shown in Figs. 11 and 14 the center of gravity of such invertible assembly C is below the hinge 39 by which it is supported and the leveling support 50 and the leveling table will assume by gravity a true horizontal position with the stud 8 in a true vertical position. Means are provided whereby the two-part rocking member may be locked to the supporting base 36 and the leveling support 50 may be locked to the upper section 38 of the rocking member while the invertible assembly C is still in its inverted position. After these parts have been thus locked, then the invertible assembly C is swung back about the hinge 39 into an upright position as shown in Figs. 12 and 15 and when in such upright position the leveling table 7 will have a true horizontal position and the stud 8 a true vertical position notwithstanding the fact that the head 4 of the tripod still maintains its angular position. After the invertible assembly C has been returned to its upright position as shown in Fig. 12, then the camera or other instrument 1 is again mounted on the head assembly as also shown in Figs. 12 and 15.

While any suitable means may be employed for locking the two-part rocking member to its supporting base 36 yet that herein shown has been found to be satisfactory. The shaft 42 is illustrated as having a portion 57 of reduced diameter which is formed with the conical sides 58. 59 and 60 are two clamping jaws carried by the supporting base 36 and which are adapted to have clamping engagement with the conical faces 58 to lock the shaft 42 against turning movement about its axis. The ends of these clamping jaws are received in vertically extending grooves 97 formed in the two parallel upstanding walls 61 with which the base 36 is provided, said walls being connected at one end by a transverse upstanding wall 83 through which the shaft 42 extends. The lower jaw 59 has two upstanding end portions 84 that are received in said vertical grooves 97 and the upper jaw is received between the upstanding portions 84 of the lower jaw, the inner faces of said upstanding portions 84 being shown as provided with vertical grooves in which the ends of the upper jaw 60 are received. Means are provided for moving these clamping jaws 59, 60 toward each other to cause them to frictionally engage the conical faces 58.

Mounted in the two upstanding walls 61 is a shaft 62 which has two eccentric portions 63 (see Fig. 7) that extend through openings in the upstanding ends 84 of the lower clamping member 59. Said shaft 63 also has another eccentric portion 64 adapted to engage the upper side of the clamping jaw 60. These eccentric portions 63 and 64 are oppositely disposed and as the shaft 62 is turned the eccentric portions 63 will raise the lower jaw 59 while the eccentric portion 64 moves the upper clamping jaw 60 downwardly. The jaws are shown in Figs. 1 and 7 in their operative clamping positions. When the shaft 62 is turned through 180 degrees from the position shown in Fig. 7 the clamping jaws will be released and will be separated from each other and from the surfaces 58 by means of suitable springs 65. It will be understood, of course, that when the invertible assembly C is in its inverted position the shaft 62 is turned by means of the thumb piece 66 so as to bring the clamping jaws 59 and 60 into clamping engagement with the conical faces 58 thereby rigidly clamping the rocking member to the base 36.

Similarly any desirable means for clamping the leveling support 50 to the upper section 38 of the rocking member may be employed. As herein shown the rib 49 on the underside of the leveling support 50 is formed with two inclined faces 68 adapted to be engaged by clamping members 69 carried by the upper section 38 of the rocking members. These clamping members are manipulated by a clamping screw 70 which has a screw-threaded portion 71 extending through and with which one clamping member 69 has engagement and another screw-threaded portion 72 extending through and having screw-threaded engagement with the other clamping member 69. The screw threads 70 and 71 have opposite pitch, and therefore, the turning of the screw 70 will cause these clamping members 69 to move toward or from each other depending on the direction in which the screw is turned. These clamping blocks 69 rest freely on a flat surface 73 with which the upper section 38 of the rocking member is provided and the screw 70 extends through the wall 74 of said member and is provided with a knurled thumb piece 75 by which it may be turned.

When the screw is turned to move the clamping members 69 away from each other, the leveling support 50 will then be free to turn about its pivot 51, and this is the condition that exists when said leveling support 50 is swung into its inverted position.

When the leveling support has assumed by gravity its true vertical but inverted position, then the clamping screw 70 is turned to cause the clamping members 69 to move toward each other and thus to be clamped against the two inclined faces 68, an operation which will lock the leveling support 50 to the upper section 38 of the rocking member. The fact that the clamping members 69 and the screw 70 are capable of bodily movement in the direction of the length of the shaft 70 provides a construction in which the two clamping members 69 may be brought into clamping engagement with the inclined surfaces 68 regardless of the angular position of the leveling support 50 relative to the upper section 38 of the rocking members.

After the leveling support 50 and leveling table 7 have been thus leveled up and have been restored to their upright position as shown in Figs. 12 and 15, the two sections 37, 38 of the rocking member are locked in their closed relation. The upper member 38 is shown as having a downward extension 76 which overlies the upper end of the wall 45 of the base 36 and the latter carries a clamping screw 77 which can be brought into clamping engagement with the extension 76 thereby to lock the upper section of the rocking member in its closed relation.

The upper section 38 of the rocking member is cylindrical and the lower section 37 is formed with a concave end wall 94 against which the convex side of the member 38 rests when said member and the panning assembly are in their inverted position.

With my improvements the leveling up of the leveling table is a simple matter. If it is assumed that when the camera tripod is originally set up it has a slightly angular position as shown in Figs. 10 and 13 (Fig. 10 being a view looking toward the front of the camera and Fig. 13 being a side view), the operation of leveling up the levelling table while the tripod still retains its angular position involves simply the operation of swinging the invertible assembly C into an inverted position shown in Figs. 11 and 14, so as to allow the leveling table to assume by gravity a correct horizontal position, it being understood that at this time the clamping jaws 59, 60 are disengaged from the conical faces 58 so as to allow the shaft 42 to turn freely in its bearings and the clamping members 69 are also separated sufficiently to allow the leveling table 50 to swing freely about its horizontal axis 51.

When the leveling table has assumed its horizontal position by gravity as shown in Figs. 11 and 14, then the jaws 59, 60 are clamped against the inclined faces 58 by turning the shaft 62 and the clamping members 69 are brought into clamping engagement with the underfaces 68 of the rib 49 by operation of the screw 70, thereby locking the rocking member from turning movement relative to the base 36 and also locking the leveling support 50 from turning movement relative to the member 38.

The invertible assembly C is then swung back into its upright position shown in Figs. 12 and 15 and is locked to the base 36 by the clamping screw 77. The camera or other instrument is then replaced on its head 16 and locked thereto by the clamping rod 19. When the invertible assembly C is thus returned to its upright position the leveling table will have a true horizontal position. The camera or other instrument carried by the head assembly will be correctly leveled.

While I have illustrated herein a selected embodiment of my invention, I do not wish to be limited to the constructional features shown.

I claim:

1. A tripod support for cameras and the like comprising a tripod having a supporting plate, a leveling table, having means for mounting a camby said leveling table, means for mounting the leveling table on the supporting plate, said latter means having provision to permit the leveling table to be swung into an inverted position and also having provision to permit said leveling table when in such inverted position to turn freely by gravity about two different horizontal axes at right angles to each other and thereby assume an inverted position with the leveling table in a horizontal plane, and two locking means, each operative while the leveling table is in its inverted position to lock it against turning movement about one of the horizontal axes, whereby when the leveling table is restored to its upright position it will occupy a true horizontal plane.

2. A tripod support for cameras and the like comprising a tripod having a supporting plate, a leveling table, having means for mounting a camera thereon to turn about a vertical axis, means mounting the leveling table on the supporting plate, said latter means including a hinge member to permit the leveling table to swing into an inverted position and also having provision other than the hinge member to permit the leveling table, when in its inverted position, to turn freely by gravity about two different horizontal axes at right angles to each other and thereby assume an inverted position with the axis thereof in a true vertical line, and two locking means, each operative while the leveling table is in its inverted position to lock it against turning movement about one of the horizontal axes, whereby when the leveling table is restored to its upright position its axis occupies a true vertical position.

3. A tripod support for cameras and the like comprising a tripod having a supporting plate, a leveling table having means for mounting a camera thereon, an intermediate member for mounting the leveling table on the supporting table, said intermediate member comprising a lower section mounted on the supporting plate to turn about a horizontal axis, an upper section to which the leveling table is pivotally connected to turn about a horizontal axis at right angles to that of the lower section, a hinge connecting said sections to permit the upper section with the leveling table to be swung into an inverted position, in which position the leveling table is free to turn by gravity about said horizontal axes and to assume a position in a horizontal plane, and two locking means, each operative when the leveling table is in its inverted position to lock the intermediate member and said leveling table against turning movement about one of said horizontal axes, whereby when the upper section of the intermediate member is restored to its upright position the leveling table is in a horizontal plane.

4. A tripod support for cameras and the like comprising a tripod having a supporting plate, a rocking member carried by said plate to turn about a horizontal axis, a leveling table mounted on the rocking member to turn about a horizontal axis at right angles to that of the rocking member, means for mounting a camera on said leveling table, said rocking member being made with an upper section and a lower section hingedly connected together to permit the upper section and the leveling table mounted thereon to swing from a normal upright position into an inverted position, in which inverted position the leveling table is free to swing by gravity about the two horizontal axes to bring said leveling table into a horizontal plane, and means operative while the leveling table is in its inverted position to lock the rocking member against turning movement about its horizontal axis and other means also operative while the leveling table is in the inverted position to lock the leveling table against turning movement about its horizontal axis whereby when the upper portion of the rocking member and the leveling table are restored to their upright position said leveling table will be located in a horizontal plane.

5. A tripod support for cameras and the like comprising a tripod, a leveling table, means mounting the leveling table on the tripod, a vertical pivot post rigid with the leveling table, a camera-supporting member mounted on said leveling table to turn about said pivot post, a gear fast on said pivot post, an inertia wheel rotatively carried by said camera-supporting member and a pinion rigid with said inertia wheel and meshing with said gear.

6. A tripod support for cameras and the like comprising a tripod, a camera-supporting member, means mounting said member on the tripod, an arm mounted on said camera-supporting member to turn about a horizontal axis, means for mounting a camera on said arm, an inertia wheel rotatively mounted on said camera-supporting member and gearing connecting said arm with the inertia wheel whereby turning movement of the arm about its horizontal axis will rotate the inertia wheel.

7. A tripod support for cameras and the like comprising a tripod, a camera-supporting member, means mounting said member on the tripod, said member having two spaced upstanding side members, an arm having trunnions journaled in said side members and turnable about a horizontal axis, means for mounting a camera on said arm, an inertia wheel rotatively mounted on each side member and gearing connecting said arm with both inertia wheels whereby swinging movement of said arm and the camera carried thereby about the horizontal axis will rotate the inertia wheels.

8. A tripod support for cameras comprising a tripod, a camera-supporting member having two spaced upstanding side members, means mounting a camera on said camera-supporting member, an arm situated between said side members and having trunnions journaled therein, a horizontal shaft mounted in said side members and extending parallel to the trunnion axis, a gear on said shaft, gear teeth on the arm meshing with said gear, an inertia wheel rotatively mounted on each side member and gearing connecting said shaft with each inertia wheel.

9. A tripod for cameras and the like comprising a tripod head assembly, said assembly in turn comprising a base and an invertible assembly, means pivotally mounting the invertible assembly on the base to permit it to swing from an upright to an inverted position and when in inverted position to swing by gravity about a horizontal axis other than that about which said invertible assembly swings in moving from its upright to its inverted position, said invertible assembly in turn comprising a leveling table, means for mounting a camera thereon, and a pivotal support for said leveling table permitting the latter when in inverted position to swing about a second horizontal axis at right angles to the first-named horizontal axis, whereby the leveling table will assume by gravity a horizontal position, and separate locking means to lock the leveling table from turning movement about each of its horizontal axes while the invertible assembly is in its inverted position, the leveling table thereby maintaining its original level position when the invertible assembly is returned to upright position.

KENDALL T. GREENWOOD.

CERTIFICATE OF CORRECTION.

Patent No. 2,354,515. July 25, 1944.

KENDALL T. GREENWOOD.

It is hereby certified that error appears in the printed specification of the above numbered patent requiring correction as follows: Page 4, second column, line 36, claim 1, for "having means for mounting a cam-" read --camera-mounting means carried--; page 5, first column, line 1, claim 3, for "table" read --plate--; and that the said Letters Patent should be read with this correction therein that the same may conform to the record of the case in the Patent Office.

Signed and sealed this 5th day of September, A. D. 1944.

Leslie Frazer (Seal) Acting Commissioner of Patents.